(12) United States Patent
Wening

(10) Patent No.: US 9,279,538 B1
(45) Date of Patent: Mar. 8, 2016

(54) ADJUSTABLE PICTURE FRAME HANGING SYSTEM

(71) Applicant: Mark Wening, Tustin, CA (US)

(72) Inventor: Mark Wening, Tustin, CA (US)

( * ) Notice: Subject to any disclaimer, the term of this patent is extended or adjusted under 35 U.S.C. 154(b) by 34 days.

(21) Appl. No.: 14/051,436

(22) Filed: Oct. 10, 2013

(51) Int. Cl.
*A47G 1/24* (2006.01)
*F16M 13/02* (2006.01)
*A47G 1/16* (2006.01)

(52) U.S. Cl.
CPC .............. *F16M 13/022* (2013.01); *A47G 1/16* (2013.01); *A47G 1/164* (2013.01); *A47G 1/1613* (2013.01); *A47G 1/1626* (2013.01)

(58) Field of Classification Search
CPC ..... A47G 1/16; A47G 1/1606; A47G 1/1613; A47G 1/686; A47G 1/1686; A47G 1/24; A47G 1/164; A47G 1/1626
See application file for complete search history.

(56) References Cited

U.S. PATENT DOCUMENTS

| | | | |
|---|---|---|---|
| 454,111 A | 6/1891 | Coupe | |
| 500,365 A | 6/1893 | Berbecker | |
| 821,159 A | 5/1906 | Feldmann | |
| 1,794,328 A | 2/1931 | Simon | |
| 2,495,477 A | 1/1950 | Raitt | |
| 2,697,572 A | 12/1954 | Pfankuch | |
| 2,723,096 A | 11/1955 | Schwartz | |
| 3,188,028 A | 6/1965 | Waller | |
| 3,226,065 A | 12/1965 | Smith | |
| 3,251,569 A | 5/1966 | Rynearson | |
| 4,083,525 A * | 4/1978 | Rath | A47G 1/1613 248/224.8 |
| 4,171,117 A | 10/1979 | Prochaska | |
| 4,244,549 A | 1/1981 | Oldfield | |
| 4,566,665 A | 1/1986 | Rynearson | |
| 4,641,807 A | 2/1987 | Phillips | |
| 4,830,325 A | 5/1989 | Anderson | |
| 4,863,135 A | 9/1989 | Mellor et al. | |
| 4,976,409 A | 12/1990 | Hansen | |
| 5,303,895 A * | 4/1994 | Hart | A47G 1/168 248/475.1 |
| 5,791,625 A | 8/1998 | Orser | |
| 5,806,826 A | 9/1998 | Lemire | |
| 5,878,987 A | 3/1999 | Hayde | |
| 5,931,439 A | 8/1999 | Lemire | |
| 5,947,438 A | 9/1999 | Lemire | |
| 6,062,525 A | 5/2000 | Lemire | |

(Continued)

OTHER PUBLICATIONS

"Incredible Hooks", imported into the United States by Greenbrier International, Inc., for sale at least as early as Jun. 2013 by Amazon.com; 3 pages.

(Continued)

*Primary Examiner* — Christopher Garft
(74) *Attorney, Agent, or Firm* — Alford Law Group, Inc.; William E. Alford (57) ABSTRACT

In one embodiment of the invention, an adjustable frame hanging system is disclosed that includes a bracket; an adjustable hanger to couple to a picture frame and engage the bracket; fastening devices to couple the bracket to a vertical support structure and to couple the adjustable hanger to the picture frame. The bracket includes a first gear segment, and a flexible hook to engage the adjustable hanger. A second gear segment of the hanger meshes with the first gear segment to hold the orientation of the picture frame. The flexible hook holds the adjustable hanger engaged with the bracket and the picture frame mounted to the vertical support structure. The second gear segment can be adjusted a few teeth with respect to the first gear segment to alter the angular orientation of the picture frame so that it is mounted to the vertical support structure level with the floor.

22 Claims, 9 Drawing Sheets

(56) References Cited

U.S. PATENT DOCUMENTS

| | | |
|---|---|---|
| 6,283,434 B1 | 9/2001 | Holder |
| 6,318,698 B1 | 11/2001 | Hansen |
| 6,663,075 B2 | 12/2003 | Zuller |
| 6,880,795 B1 | 4/2005 | Haynes, III |
| 7,497,411 B2 | 3/2009 | Weck et al. |
| 7,686,273 B2 | 3/2010 | Christodoulou |
| 7,708,252 B2 * | 5/2010 | Vander Berg ........ A47B 96/027 248/475.1 |
| 7,762,517 B1 | 7/2010 | Leseman |
| 7,913,967 B1 | 3/2011 | Aleo |
| 8,141,838 B2 | 3/2012 | Johnson et al. |
| 8,376,308 B2 | 2/2013 | Greve |
| 2006/0108486 A1 | 5/2006 | Nowak |
| 2007/0295879 A1 | 12/2007 | Wong |
| 2007/0295880 A1 | 12/2007 | Wong |
| 2012/0112022 A1* | 5/2012 | Cheng ................... A47G 7/044 248/205.3 |
| 2012/0153108 A1* | 6/2012 | Schneider ............. F16M 13/02 248/224.8 |

OTHER PUBLICATIONS

"Gear", from Wikipedia, the free encyclopedia, Sep. 10, 2013; 25 pages.

* cited by examiner

ADJUSTABLE PICTURE FRAME HANGING SYSTEM

FIELD

The embodiments of the invention relate generally to hangers for picture frames.

BACKGROUND

Picture frames with framed paintings or other framed artwork are often hung on a wall only to become crooked or unleveled. If initially hung straight and level, the picture frame often ends up moving due to vibrations of the wall to which it is hung and ends up hanging crooked.

Picture frames for much artwork are hung by a wire that stretches across the back of the frame. The wire is inserted onto a hook that is secured to a wall with one nail. The frame is then adjusted by sliding the wire over the hook until centered. This holds up the frame just fine but it may not stay level for long periods of time. Vibrations of a wall can cause the wire to slip on the nail so that the frame becomes crooked. The vibrations of the wall, for example, may be due to an earthquake, loud noises, or neighbors sharing a wall, floor or ceiling.

Another approach to hanging picture frames is to couple a straight sawtooth hanger to the back of the picture frame. The picture frame with the straight sawtooth hanger is then hung on a nail in the wall. The picture frame is then adjusted by laterally moving the straight sawtooth hanger over the nail until it pivots to the desired orientation. Friction between the base of the picture frame and the wall, if any, is supposed to keep the frame at a desired orientation, level with the floor. However, a picture frame with a single straight sawtooth hanger can still pivot about the nail and eventually may become crooked, such as from wall vibrations.

It is desirable to keep picture frames hung on a wall level.

BRIEF SUMMARY

The embodiments of the invention are summarized by the claims that follow below.

BRIEF DESCRIPTION OF THE DRAWINGS

Features, aspects, and advantages of the embodiments of the invention disclosed will now be described with reference to the drawings, which embodiments are intended to illustrate and not to limit the disclosure, as are described in varying degrees of detail below.

DETAILED DESCRIPTION

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, and components have not been described in detail so as not to unnecessarily obscure aspects of the embodiments of the invention.

Many alternative embodiments of the present aspects may be appropriate and are contemplated, including as described in these detailed embodiments, though also including alternatives that may not be expressly shown or described herein but as obvious variants or obviously contemplated according to one of ordinary skill based on reviewing the totality of this disclosure in combination with other available information. For example, it is contemplated that features shown and described with respect to one or more particular embodiments may also be included in combination with another embodiment even though not expressly shown and described in that specific combination.

For purpose of efficiency, reference numbers may be repeated between the figures where they are intended to represent similar features between otherwise varied embodiments, though those features may also incorporate certain differences between embodiments if and to the extent specified as such or otherwise apparent to one of ordinary skill (such as differences clearly shown between them in the respective figures).

The embodiments of the invention include a method, apparatus and system for an adjustable frame hanger. With an adjustable hanger, framed artwork can be hung and easily adjusted within a bracket. Once adjusted to level with the adjustable frame hanger, the framed artwork is not easily moved by vibrations and remains level. The adjustable hanger and bracket of the adjustable frame hanger are quick and easy to install with fasteners.

Figure 1:
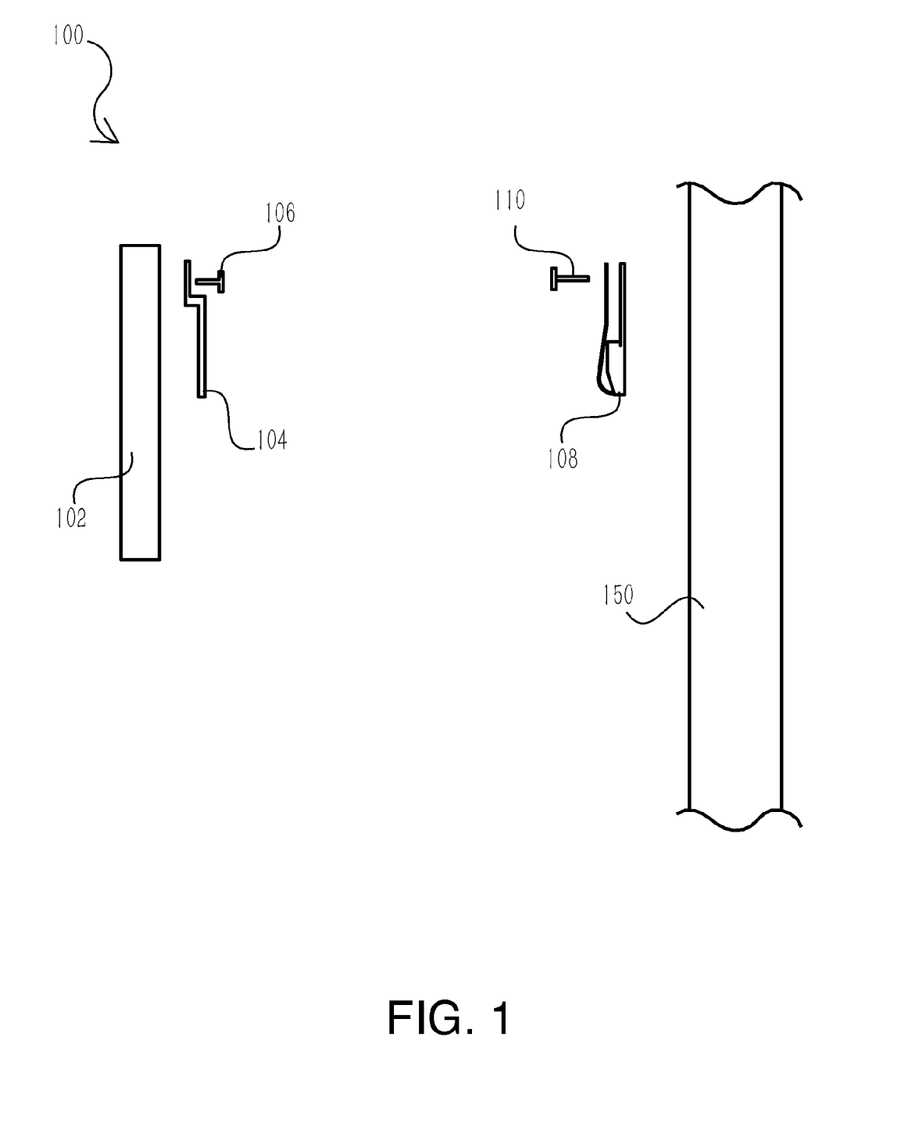
FIG. 1 illustrates an exploded view of an adjustable picture frame hanging kit and system for mounting a picture frame for artwork, such as a picture or painting, to a vertical support structure, such as a wall.

Referring now to FIG. 1, an adjustable frame hanging system 100 is illustrated. The adjustable frame hanging system 100 includes an adjustable frame hanger or adjustable hanger 104, a first fastening device 106, a wall mount or bracket 108, and a second fastening device 110. The adjustable frame hanging system 100 is a simple do-it-yourself system that can be readily installed by users.

The bracket 108 is mounted up against a vertical support structure 150, such as a wall, by the fastening device 110. The fastening device 110 may be an adhesive, a double-sided adhesive tape, or a plurality of fasteners, such as nails, tacks, anchors, or screws. Washers may be used in conjunction with the fasteners. Alternatively, fasteners with washer-heads may be used. In one embodiment of the invention, two or more nails are used at each end of the top of the bracket as the fastening device to mount the bracket to the support structure for strength and stability. A plurality of openings in a top bar of the bracket receive the plurality of nails.

The adjustable hanger 104 is mounted to a picture frame 102 by the fastening device 106. The picture frame (also referred to as framed artwork) 102 includes artwork of some type, such as a painting, photograph, lithograph, etc., mounted thereto and displayed within its opening. Instead of a picture frame 102, an object may have the adjustable hanger 104 mounted to it. The object may an art object or a clock, for example. The fastening device 106 may be an adhesive, or double-sided adhesive tape, or a plurality of fasteners, such as nails, tacks, or screws. Washers may be used in conjunction with the fasteners or fasteners with washer-heads may be used. In one embodiment of the invention, two or more screws are used at each end of the adjustable hanger to mount the hanger to the back of the picture frame for added strength. One or more openings in tabs of the adjustable hanger receive the plurality of screws. The adjustable hanger is usually mounted near the top of the picture frame to more easily engage the hanger and bracket and to allow easier angular adjustment between each. However, it could be mounted in the upper half of the back of a picture frame to a solid backing into which the fastening device or devices may couple.

Figure 2A:
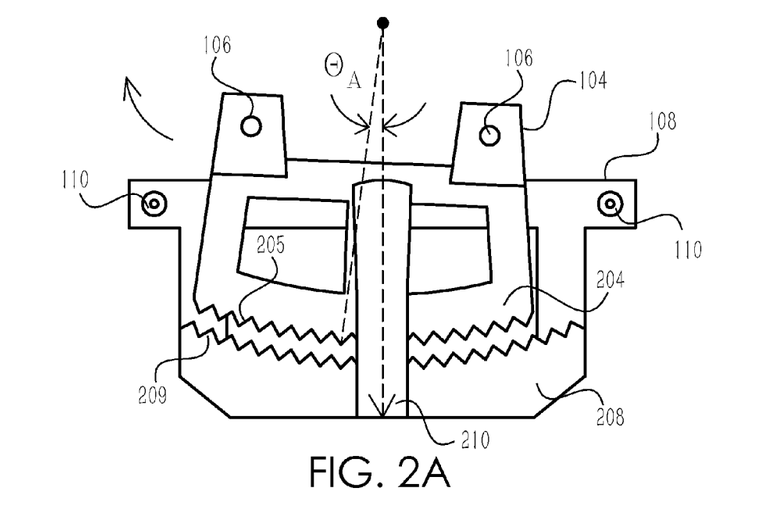
FIG. 2A illustrates the adjustable picture frame hanging system having an adjustable hanger with a slight pivot or angular rotation to engage into a bracket to obtain a level pivotal orientation of a frame.

Referring now to FIG. 2A, the adjustable hanger 104 is shown engaged with the bracket 108. The adjustable hanger 104 includes a convex gear segment 204 in accordance with one embodiment of the invention. The convex gear segment 204 includes a plurality of teeth 205 arranged along an arc of a radius. The bracket 108 includes a concave gear segment 208 in accordance with one embodiment of the invention. The bracket 108 includes teeth 209 arranged along an arc of a radius. The teeth 209 of the bracket engage the teeth 205 of the adjustable hanger 104 when properly positioned to support the picture frame 102. The gear segments may also be referred to as radial sawtooth herein.

In one embodiment of the invention, each gear segment is formed of straight-cut teeth like a spur gear for them to interleave or mesh together. The straight cut teeth project radially from an arc having a radius. Other types of teeth and gearing may be used for each gear segment provided that they mesh properly together.

The bracket 108 further includes a flexible hook 210 that receives the adjustable hanger 104 to hold it engaged with the bracket 108. The force of gravity also plays a part in keeping the gear segments of the adjustable hanger and bracket meshed together to hold the orientation of the picture frame with the vertical support structure. In an alternate embodiment of the invention, the adjustable hanger and bracket (and/or their respective gear segments) may be formed of metal and magnetized so that they are attracted to one another and provide an additional force to hold them engaged together. The flexible hook 210 is made wide so it has a strong lever arm to keep the frame 102 mounted against the vertical support structure 150.

If the bracket 108 is not positioned level with the floor, the adjustable hanger 104 allows adjustment over one or more teeth 205, 209 to make the frame 102 level with the floor. If the picture frame is initially mounted crooked to a wall or other vertical support structure, the adjustable hanger 104 allows adjustment of the picture frame with the bracket 108 over one or more teeth to make the frame level with the floor.

The adjustable hanger 104 and bracket 108 may be each formed out of a metal or alloy, in accordance with one aspect of the invention, to provide a very strong adjustable hanging system. Alternatively, the adjustable hanger 104 and bracket 108 may be each formed out of a type of plastic, in accordance with another aspect of the invention, to provide lower costs of manufacturing and lower retail prices.

In FIG. 2A, an angle of theta-sub A ($\Theta_A$) is shown illustrating the amount of angular adjustment made between the frame and the bracket to achieve a level frame orientation. The angle $\Theta_A$ may be decreased or increased with each tooth of adjustment between the teeth 205 and 209 of the respective gear segments.

Figure 2B:
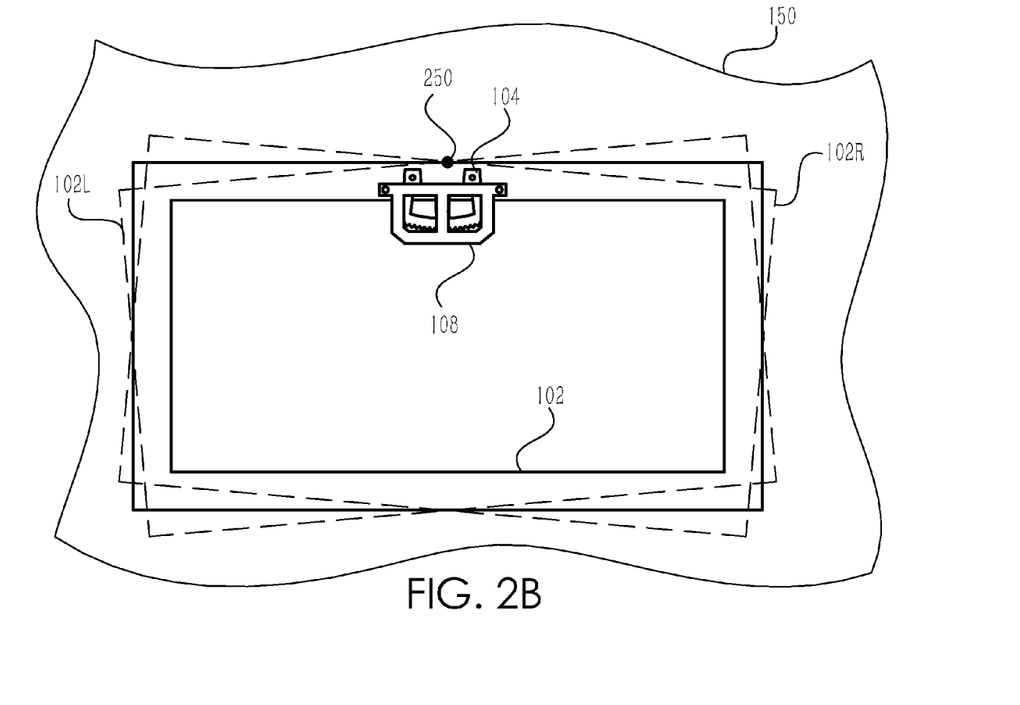
FIG. 2B illustrates a back view of adjusting a frame with the adjustable picture frame hanging system clockwise and/or counterclockwise to obtain a level pivotal orientation.

As illustrated in the back side view of FIG. 2B, the picture frame 102 may be pivotally adjusted counter-clockwise (when viewed from the front) as illustrated by the dashed line rectangle 102R. Alternatively, the picture frame 102 may be pivotally adjusted clockwise (when viewed from the front) as illustrated by the dashed line rectangle 102L. The adjustable hanger 104 is preferably mounted in a top center region near around a top center point 250 of the picture frame 102. The bracket 108 is mounted to the vertical support structure 150 a little lower than the desired position of the top of the picture frame 102 when hung with the adjustable hanger engaged into the bracket.

Figure 3A:
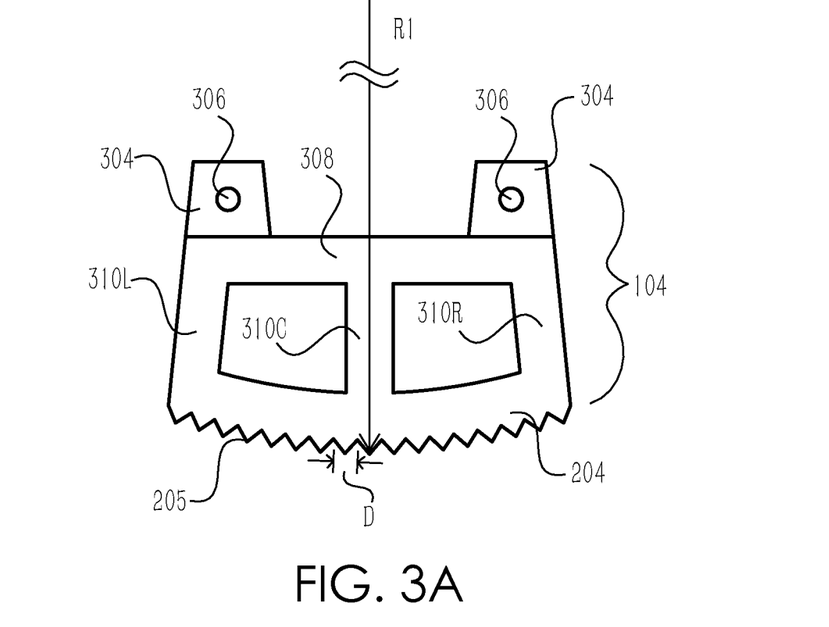
FIG. 3A is a front view of an adjustable hanger having a convex gear segment with a first radius.
Figure 3B:
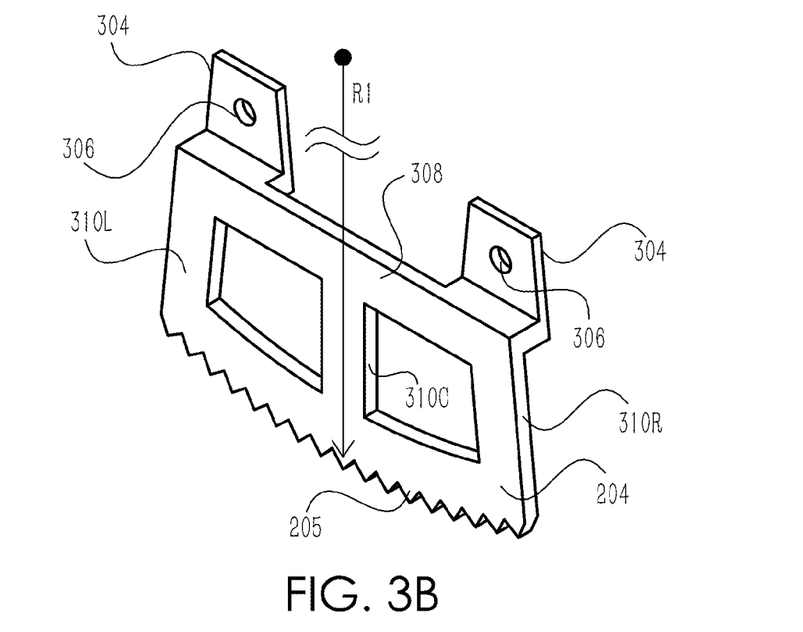
FIG. 3B is a perspective view the adjustable hanger of FIG. 3A.

Referring now to FIGS. 3A-3B, views of the adjustable hanger 104 are illustrated. The adjustable hanger 104 includes a plurality of offset tabs 304 spaced apart from each other and coupled to a top bar 308 at opposite ends thereof. Each offset tab 304 may include a hole 306 to receive a fastener 106. Hanging down from and coupled to the top bar 308 are a left brace 310, a center brace 310C, and a right brace 310R. First ends of the left brace 310 and right brace 31 OR are coupled near opposite ends of the top bar. A first end of the center brace 310C is coupled near a midpoint of the top bar. A convex gear segment 204 is coupled to the left brace 310L, the center brace 310C and the right brace 310R at second ends opposite their first ends. Second ends of the left brace 310L and the right brace 31 OR are coupled near opposite ends of the gear segment. A second end of the center brace 310C is coupled near a midpoint of the gear segment. As discussed previously, the convex gear segment 204 includes teeth 205.

Figure 3C:
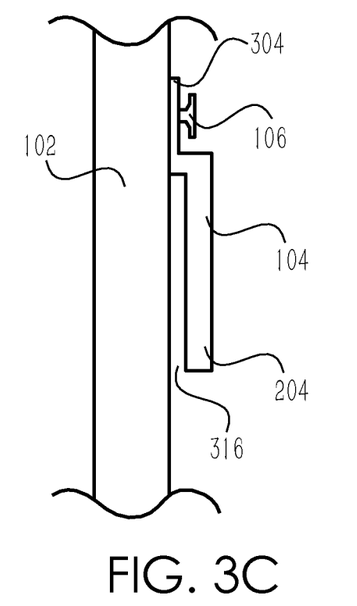
FIG. 3C is a side view of the adjustable hanger of FIG. 3A mounted to a frame.

Referring now to FIG. 3C, the adjustable hanger 104 is illustrated mounted to a frame 102. The offset tabs 304 of the adjustable hanger 104 have a surface in a plane spaced apart (offset) from a surface of the top bar 308. Mounted near the top of the frame 102, the offset tabs 304 are offset from the top bar 308 and form a gap or offset 316 between the braces 310 and the gear segment 204 of the adjustable hanger 104. The gap 316 provides clearance for the receipt of the flexible hook 210 of the bracket 108. The offset or gap 316 provided by the offset tabs 304 allows the gear segment 204 to be inserted into the bracket 108 and engage the gear segment 208. The gap or offset 316 is approximately the thickness of the flexible hook 210. In one embodiment of the invention, the plurality of fasteners 106 are screws inserted through the holes 306 of the tabs 304 and screwed into the frame 102.

Figure 4A:
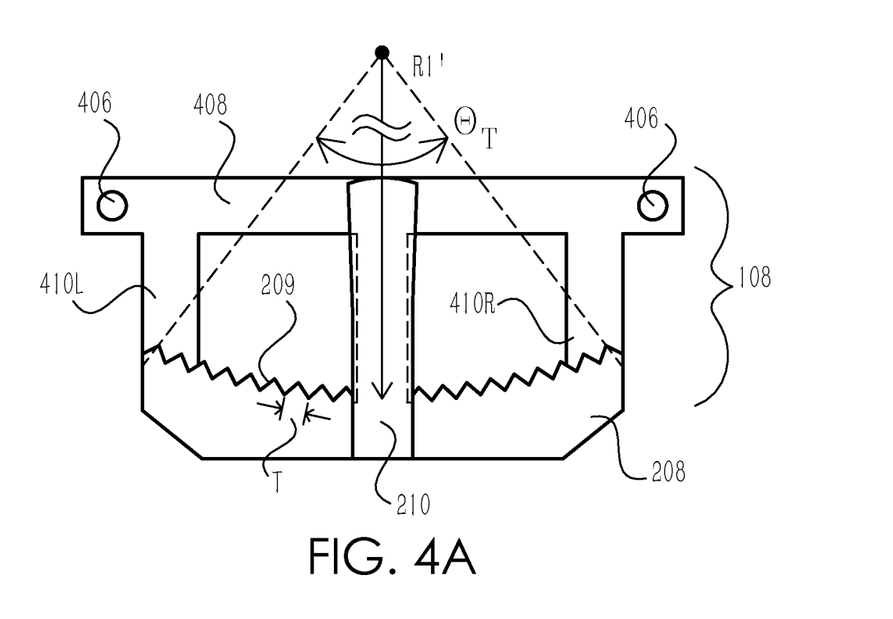
FIG. 4A is a front view of a bracket having a concave gear segment with a radius to mesh with the convex gear segment of the adjustable hanger shown in FIG. 3A.
Figure 4B:
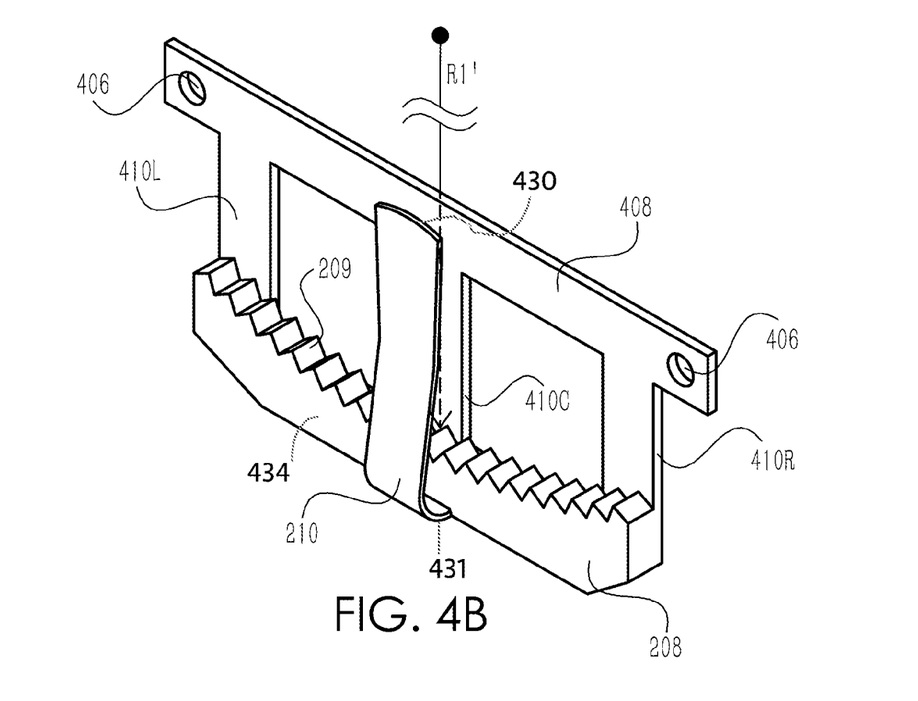
FIG. 4B is a perspective view of the bracket of FIG. 4A.

Referring now to FIGS. 4A-4B, views of the bracket 108 are illustrated. The bracket 108 includes a top bar 408, a left brace 410L, a center brace 410C, a right brace 410R, the flexible hook 210, and the concave gear segment 208 coupled together as shown. An end of each of the left brace 410L and the right brace 4100R are respectively coupled near left and right ends of the top bar 408. An opposite end of each of the left brace 410L and the right brace 410R are respectively coupled near left and right ends of the concave gear segment 208. An end of the center brace 410C is coupled to the top bar 408 near its middle portion. An opposite end of the center brace 410C is coupled near a middle portion of the concave gear segment 208.

As shown in FIG. 4B, the flexible hook 210 of the bracket 108 has a free end 430 extending up from an attached end 431. The attached end 431 of the flexible hook 210 couples to an external surface of the base 434 of the concave gear segment 208 near the gear segment's middle portion.

The top bar 408 includes a plurality of openings 406 to receive fasteners 110 so that it can be mounted flush against the wall or other vertical support structure.

Figure 4C:
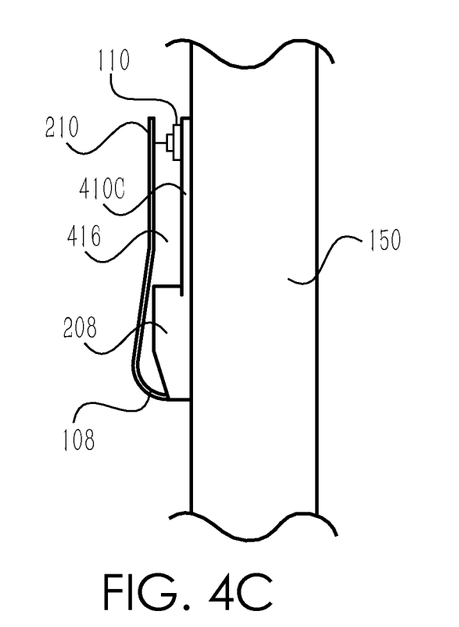
FIG. 4C is a side view of the bracket of FIG. 4A attached to a vertical support structure, such as a wall.

Referring now to FIG. 4C, the bracket 108 is shown mounted against a vertical support structure 150, such as a wall, by the fastener 110. The gear segment 208 has a thickness greater than the thickness of the braces 410L,410C, 410R. As shown, the flexible hook 210 is coupled to the base of the gear segment 208. This forms a gap 416 between the flexible hook 210 and the center brace 410C of the bracket 108. The gap 416 allows the adjustable hanger 104 to be inserted therein such that its convex gear segment 204 engages with the concave gear segment 208 of the bracket 108.

The flexible hook 210 can slightly flex to receive and guide the adjustable hanger 104 into the bracket 108. The flexible hook 210 can then flex back and hold the adjustable hanger 104 and the bracket 108 engaged together. The flexible hook 210 further holds the picture frame mounted to the vertical support structure. The teeth of each gear segment mesh together so that the adjustable hanger and bracket are properly engaged together to hold the angular orientation of each, such that the angular or pivotal orientation of the picture frame 102 with respect to the support structure 150 is maintained as well. The gear segment has a thickness (face width or depth of the teeth) greater than one-eighth of an inch to better mesh the teeth and form a union between the adjustable hanger and bracket when the system is mounted. In one embodiment of the invention, each gear segment has a thickness of approximately three-sixteenths of an inch.

Angular Adjustment Per Tooth

Each of the gear segments 204,208 have teeth 205,209 arranged along arcs or curves so they can mesh together. The adjustable hanger can be disengaged slightly from the bracket so that the teeth of the gear segments can be unmeshed. The adjustable hanger and picture frame can be rotated clockwise or counter-clockwise by one or more teeth so that a crooked picture frame can be leveled. Each tooth of adjustment provides an angle of rotation between the bracket and the adjustable hanger. The angular rotation per tooth is a function of the radius of the gear segments and pitch/size of their teeth.

Referring now to FIGS. 3A and 4A, gear segment 204 has a radius R1 from a center point or axis of a circle associated with its teeth 205. Gear segment 208 has a radius R1' from a center point or axis of a circle associated with its teeth 209 to mesh with the gear segment 204. The radii R1,R1' of the gear segments influence how much angular rotation there is to adjust the picture frame against a wall so that it is level. The dimensions of the teeth 209,205 and the number of teeth in each gear segment additionally influence the angle of rotation achieved per tooth between the adjustable hanger 104 and the bracket 108. The larger the diameter D of the teeth, the greater the teeth pitch T and thus, the greater the angle of rotation per tooth. The smaller the diameter D of the teeth, the lesser the teeth pitch T and thus, the smaller the angle of rotation per tooth. The number of teeth 209, 205 in each gear segment and the angle of rotation per tooth also influences the total angle of adjustment $\Theta_T$ of the adjustable hanger and picture frame. Practically, the angle of rotation of the adjustable hanger 104 is limited to about one half the total number of the teeth in each direction, or one half the total angle of adjustment $\Theta_T$ clockwise and counter-clockwise from center.

The larger the radius for the interleaving gear segments, the less is the angular rotation per tooth. In FIGS. 3A and 4A, a relatively large radii R1,R1' for each interleaving gear segment is illustrated. There is an overall angle of each gear segment from one end to the opposite end that can be divided by the number of teeth. With a relatively large radius, each tooth of each gear segment provides a finer angular adjustment per tooth between the adjustable hanger and the bracket.

Figure 5A:
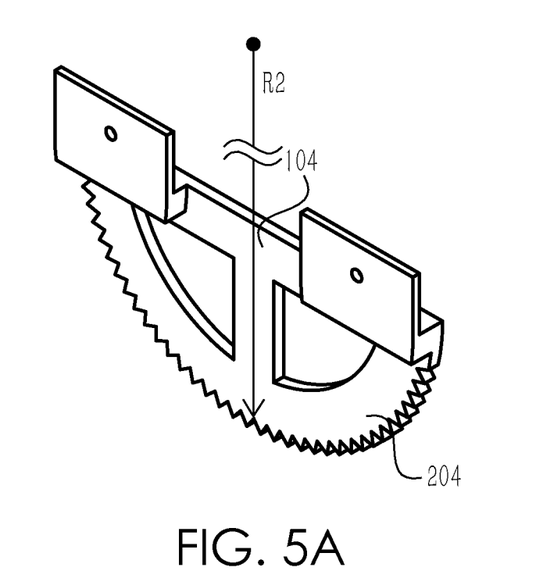
FIG. 5A is a perspective view an adjustable hanger having a convex gear segment of a second radius differing from the first radius of the adjustable hanger shown in FIG. 3A.
Figure 5B:
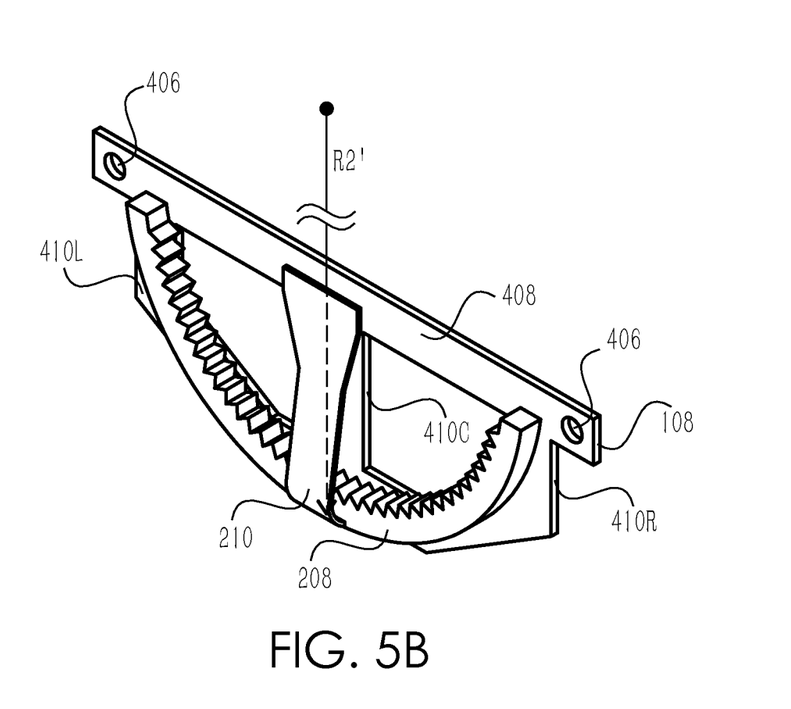
FIG. 5B is a perspective view of a bracket having a concave gear segment with a radius to mesh with the convex gear segment of the adjustable hanger shown in FIG. 5A.

Referring now to FIGS. 5A-5B, gear segment 204 has a radius of R2 from a center point or axis of a circle associated with its teeth. Gear segment 208 has a radius R2' from the center point or axis of the circle associated with its teeth to mesh with the gear segment 204. Because radii R2,R2' are smaller than the radii R1,R1', the gear segments 204,208 have a sharper curve and a greater total overall angle over the range of teeth.

With similarly sized teeth, the angle or rotation per tooth between the adjustable hanger 104 and the bracket 108 shown in FIGS. 5A-5B will be greater than the angle or rotation per tooth of the adjustable hanger and bracket shown in FIGS. 3A-3B and 4A-4B. In some applications, this greater angle of adjustment per tooth provided by the radii R2,R2' shown in FIGS. 5A-5B may be desirable. In other applications, a smaller angle of adjustment per tooth provided by the radii R1,R1' shown in FIGS. 3A and 4A may be desirable.

Scaled Adjustable Frame Hangers

Picture frames come in different sizes and different weights. The adjustable frame hanging system can be scaled to different sizes, to accommodate different sizes and/or different weights.

Figures 6A, 6B, 6C:
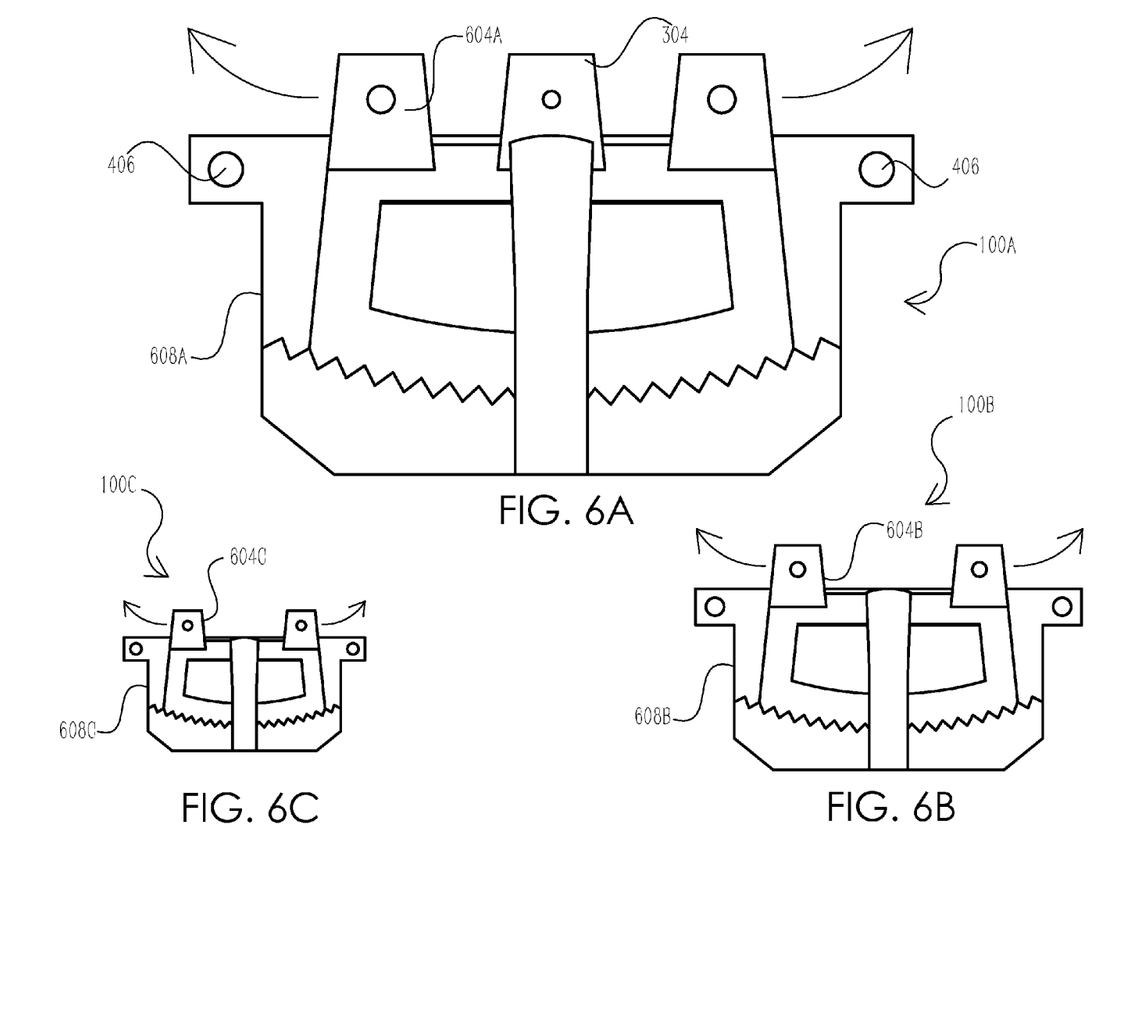
FIGS. 6A-6C are exemplary front side views of the adjustable frame hanging system scaled for different size picture frames.

Referring now to FIGS. 6A-6C, front views of adjustable frame hanging systems 100A-100C are shown. Each of the adjustable hangers in the adjustable frame hanging systems 100A-100C can be rotated clockwise or counterclockwise as illustrated by the arrowheads in each figure to adjust a picture frame to level.

The adjustable frame hanging systems 100A-100C are each scaled for different sized frames and/or different weighted frames that are to be supported. For example, the adjustable frame hanging system 100A, including the adjustable hanger 604A and the bracket 608A, is relatively large in size to accommodate a large picture frame that may be heavy. In FIG. 6C, the adjustable frame hanging system 100C includes a adjustable hanger 604C and a bracket 608C that are relatively small in size to handle a substantially smaller picture frame than that of the adjustable frame hanging system 100A. In FIG. 6B, an adjustable frame hanging system 100B is shown including the adjustable hanger 604B and the bracket 608B of an intermediate scale, between that of the adjustable frame hanging systems 100A and 100C.

The number of holes 306,406 and fasteners 106,110 may be increased from two each as the size of the adjustable frame hanging system is scaled upward. In FIG. 6A for example, the adjustable hanger 604A includes three offset tabs 304 with three holes to allow three fasteners to mount the hanger to a large picture frame. In an alternate embodiment, the offset tabs may be merged together into an offset bar to selectively allow additional holes and fasteners to be used to mount the hanger to a picture frame. Additional holes may be added to the bracket 608A to accept additional fasteners to mount the bracket to a vertical support structure.

Convex and Concave Gear Segments

FIGS. 2A-6C illustrate adjustable hangers with a convex gear segment and brackets with a concave gear segment that can mesh together. However, the curvature of the meshable gear segments could be swapped. That is, the adjustable hanger could have a concave gear segment while the bracket could have a convex gear segment.

Figure 7:
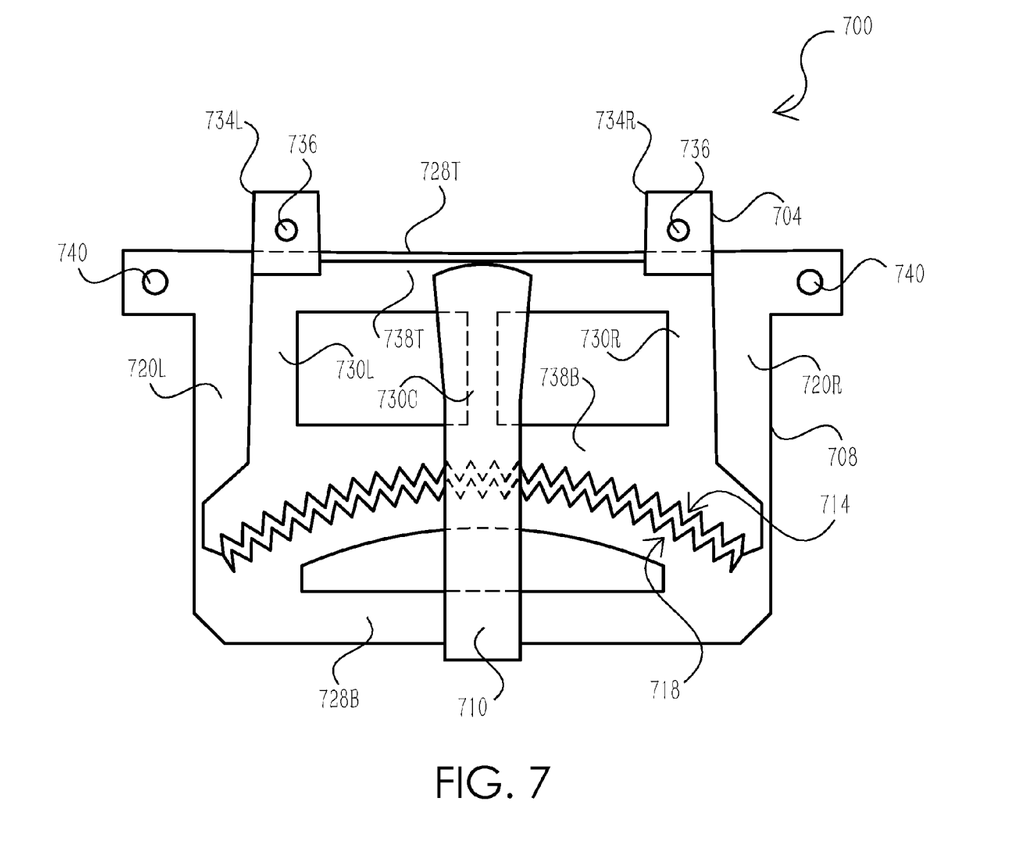
FIG. 7 is a front view of the adjustable hanger having a concave gear segment and the bracket having a convex gear segment.

Referring now to FIG. 7, an adjustable frame hanging system 700 is illustrated. The adjustable frame hanging system 700 includes an adjustable hanger 704 and a bracket 708. Instead of a convex gear segment, the adjustable hanger 704 has a concave gear segment 714. Instead of a concave gear segment, the bracket 708 has a convex gear segment 718.

The bracket 708 further includes a top bar 728T, a left brace 720L, a right brace 720R, and a bottom bar 728B coupled together as shown. Opposite ends of the convex gear segment 718 are coupled to the bottom bar 728B. One end of each of the left brace 720L and the right brace 720R are respectively coupled to left and right ends of the top bar 728T. An opposite end of each of the left brace 720L and the right brace 720R are respectively coupled to left and right ends of the bottom bar 728B.

The adjustable hanger 704 further includes a top bar 738T, a left brace 730L, a center brace 730C, a right brace 730R, and a bottom bar 738B coupled together as shown. The adjustable hanger 704 further includes left and right offset tabs 734L, 734R coupled to the top bar 738T a side opposite the braces 730L,730C,730R. The concave gear segment 714 is coupled to the bottom bar 738B. One end of each of the left brace 730L, the center brace 730C, and the right brace 730R are respectively coupled to the left end, the center portion, and the right end of the top bar 738T. An opposite end of each of the left brace 720L, the center brace 720C, and the right brace 720R are respectively coupled to the left end, the center portion, and the right end of the bottom bar 738B.

The offset tabs 734L,734R of the adjustable hanger 704 have a surface in a plane spaced apart (offset) from a surface of the top bar 738T. When the offset tabs 734L,734R are mounted to the picture frame, the gear segment 714 is spaced apart (offset) from the picture frame. The offset provided by the offset tabs allows the gear segment 714 to be inserted into the bracket 708 and engage the gear segment 718. The offset is approximately the thickness of the flexible hook 210.

Each of the left and right offset tabs 734L,734R includes an opening 736 to receive a fastener in accordance with one embodiment of the invention to mount the adjustable hanger 704 to an object. In accordance with one embodiment of the invention, the top bar 728T has a plurality of openings 740 to receive fasteners and mount the bracket 708 to a vertical support structure.

Methods of Using the Adjustable Frame Hanging System

Referring now to FIGS. 1, 2A-2B, and 8, methods of mounting a picture frame 102 to a wall 150 with the adjustable frame hanging system 100 are now described. The method begins at process 800 and goes to process 802. Initially, an adjustable hanger 104 and matching bracket 108 are selected for a given size of picture frame.

Figure 8:
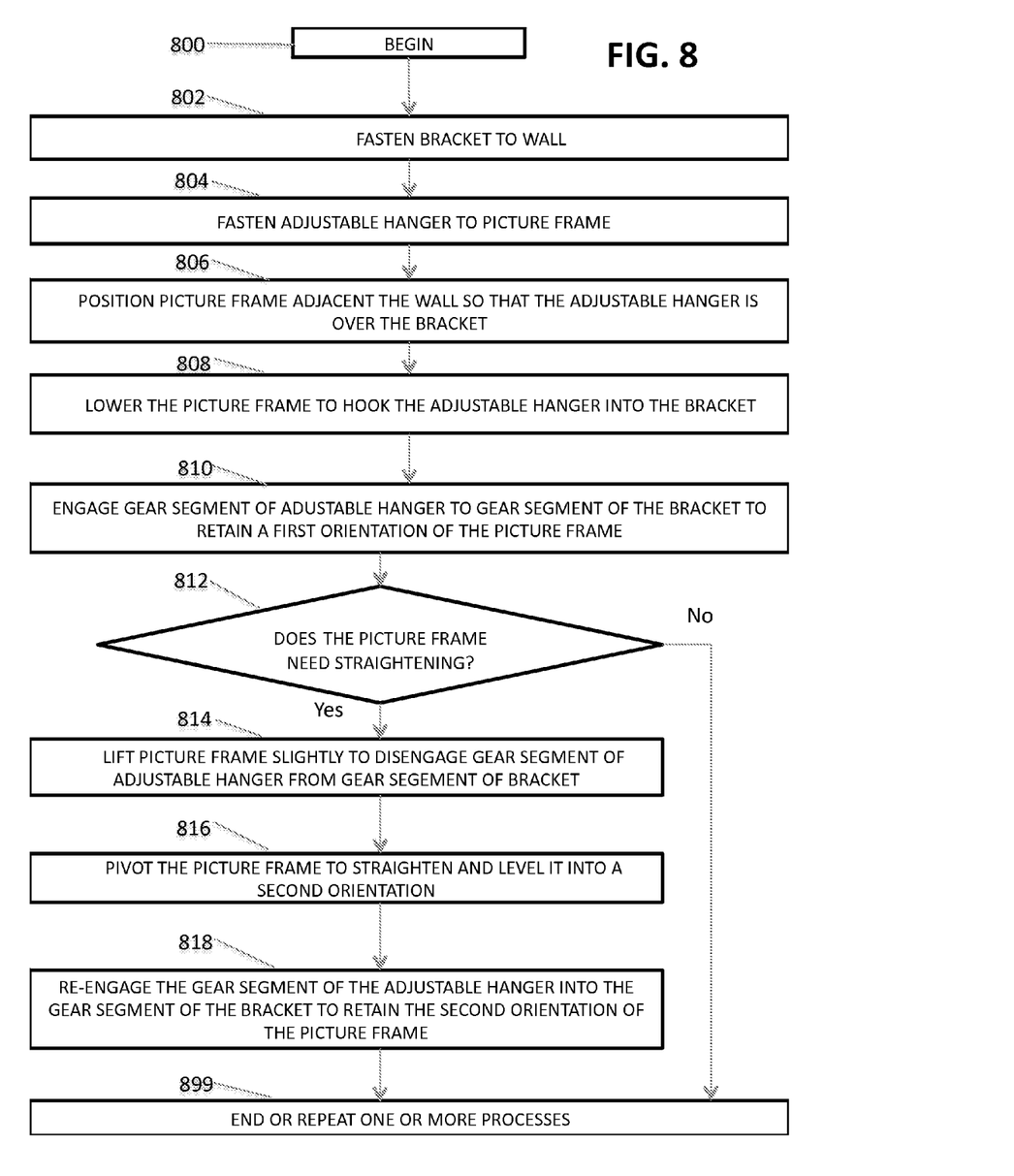
FIG. 8 is a flow chart to illustrate one or more methods of using the adjustable frame hanging system to obtain a level pivotal orientation of a picture frame.

At process 802, the bracket 108 is fastened to a wall 150 or other support structure with a pair of fasteners 110. The bracket 108 includes a radial sawtooth or gear segment 208 that is convex or concave. The process then goes to process 804.

At process 804, the adjustable hanger 104 is fastened to a picture frame 102 with a pair of fasteners 106. The adjustable hanger 104 is fastened near a top center region of the picture frame 102. The adjustable hanger 104 respectively includes a radial sawtooth or gear segment 204 that is concave or convex to respectively engage the convex or concave radial sawtooth or gear segment 208 of the bracket 108. The bracket 108 and the adjustable hanger 104 are chosen to match the size/weight of the picture frame 102. The process then goes to process 806.

At process 806, the picture frame 102 is positioned adjacent the wall 150 so that the adjustable hanger 104 is over and aligned with the bracket 108. The process then goes to process 808.

At process 808, the picture frame 102 is lowered to hook the adjustable hanger 104 into the bracket 108. The hook 210 of the bracket 108 may be flexed slightly outward and guides the gear segment 204 of the adjustable hanger 104 into the gear segment 208 of the bracket 108. The process then goes to process 810.

At process 810, the radial sawtooth or gear segment 204 of the adjustable hanger 104 is engaged into the radial sawtooth or gear segment 208 of the bracket 108 to retain a first pivotal orientation of the picture frame 102. The hook 210 of the bracket 108 holds the gear segment 204 of the adjustable hanger 104 engaged into the gear segment 208 of the bracket 108. The process goes to process 812.

At process 812, a determination is made as to whether or not the frame 102 is crooked, not level, and needs straightening. A level, such as a bubble or laser level for example, may be placed on the top edge of the frame to determine the picture frames pivotal condition. If the picture frame is substantially straight or level, the process can go to process 899 and end or repeat processes as needed. If the frame 102 is crooked, the process goes to process 814.

At process 814, the frame 102 is lifted slightly to disengage the radial sawtooth or gear segment 204 of the adjustable hanger 204 from the radial sawtooth or gear segment 208 of the bracket 108. The process then goes to process 816.

At process 816, the frame 102 is pivoted clockwise or counterclockwise to pivot the adjustable hanger 204 by one or more teeth to straighten and level the frame 102 into a second pivotal orientation 102R,102L. The process then goes to process 818.

At process 818, the radial sawtooth or gear segment 204 of the adjustable hanger 104 is re-engaged into the radial sawtooth or gear segment 208 of the bracket 108 to retain the second pivotal orientation 102R,102L of the frame 102. If the frame 102 still needs further angular adjustment to level it, one or more of the processes 812-818 can be repeated.

A user may become tired of looking at artwork framed in the initial picture frame. If it is desirable to replace the first picture frame with a second picture frame having different artwork, one or more of the processes 802-818 may be repeated upon removal of the first picture frame. The first picture frame can be simply removed from a support structure by lifting up and disengaging the adjustable hanger from the bracket.

Conclusion

The embodiments of the invention are thus described. While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

Moreover, while this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in subcombination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the claimed invention is to be limited only by patented claims that follow below.

What is claimed is:

1. An adjustable frame hanging system comprising:
   a bracket to couple to a vertical support structure, the bracket including
      a first gear segment to be parallel with the vertical support structure, and
      a flexible hook having a free end extending up from an attached end, the attached end of the flexible hook coupled to an external surface of the first gear segment;
   an adjustable hanger differing from the bracket, the adjustable hanger to couple to a picture frame and engage the bracket to mount the picture frame to the vertical support structure, the adjustable hanger including a second gear segment to be parallel with the picture frame, the second gear segment to engage the first gear segment of the bracket to hold the orientation of the picture frame;
   a first fastening device to couple the bracket to the vertical support structure; and
   a second fastening device to couple the adjustable hanger to the picture frame;
   wherein the flexible hook is to hold the adjustable hanger engaged with the bracket and the picture frame mounted to the vertical support structure.

2. The adjustable frame hanging system of claim 1, wherein
   the first gear segment is a convex gear segment and the second gear segment is a concave gear segment.

3. The adjustable frame hanging system of claim 1, wherein
   the first gear segment is a concave gear segment and the second gear segment is a convex gear segment.

4. The adjustable frame hanging system of claim 1, wherein
   the engagement of the second gear segment of the hanger with the first gear segment of the bracket can be adjusted by one or more teeth to adjust the orientation of the picture frame.

5. The adjustable frame hanging system of claim 1, wherein
   the bracket further includes a top bar to mount the bracket to the vertical support structure; and
   the adjustable hanger further includes at least one offset tab to couple the adjustable hanger to the picture frame such that the second gear segment is spaced apart from the picture frame.

6. The adjustable frame hanging system of claim 5, wherein
   the at least one tab of the adjustable hanger includes a plurality of openings to receive a plurality of fasteners;
   the top bar of the bracket includes a plurality of openings to receive a plurality of fasteners;
   the first fastening device is a first plurality of fasteners; and
   the second fastening device is a second plurality of fasteners.

7. The adjustable frame hanging system of claim 6, wherein
   the first plurality of fasteners is at least a pair of nails, a pair of screws, or a pair of rivets; and
   the first and second plurality of fasteners is at least a pair of nails, a pair of screws, or a pair of rivets.

8. The adjustable frame hanging system of claim 1, wherein
   the first fastening device and the second fastening device is double sided adhesive tape.

9. The adjustable frame hanging system of claim 1, wherein
   the first fastening device and the second fastening device is an adhesive.

10. The adjustable frame hanging system of claim 1, wherein
    the vertical support structure is a wall.

11. An adjustable hanging system comprising:
    a bracket including
       a top bar with a plurality of openings to receive a plurality of fasteners,
       left, right, and center braces each having a first end coupled to the top bar,
       a first gear segment coupled to a second end of the left, right, and center braces, the first gear segment having a first arch with a first plurality of straight teeth, and
       a flexible hook having a first end coupled to a base of the first gear segment, the flexible hook having a second end spaced apart from the top bar;
    an adjustable hanger including
       a left offset tab and a right offset tab spaced apart from the left offset tab, each offset tab including an opening to receive a fastener,
       a top bar having a left end coupled to the left offset tab and a right end coupled to the right offset tab, a surface of the top bar spaced apart from surfaces of the left and right offset tabs,
       left, right, and center braces each having a first end coupled to the top bar, and
       a second gear segment coupled to a second end of the left, right, and center braces, the second gear segment having a second arch with a second plurality of straight teeth;
    a first plurality of fasteners to insert into the plurality of openings in the top bar of the bracket, the first plurality of fasteners to hold the bracket coupled to a vertical support structure; and
    a second plurality of fasteners, one of the second plurality of fasteners to be inserted into each opening in each offset tab of the adjustable hanger, the second plurality of fasteners to hold the adjustable hanger coupled to an object;
    wherein the flexible hook of the bracket holds the adjustable hanger engaged into the bracket, and
    wherein the plurality of teeth of the second gear segment meshes with the plurality of teeth of the first gear segment to hold an angular orientation of the adjustable hanger with the bracket.

12. The adjustable hanging system of claim 11, wherein
    the object is an art object, and
    the vertical support structure is a wall.

13. The adjustable hanging system of claim 12, wherein
the art object is one of a painting, a photograph, a picture, and a plaque.

14. The apparatus of claim 11, wherein
the first gear segment is a convex gear segment and the second gear segment is a concave gear segment.

15. The apparatus of claim 11, wherein
the first gear segment is a concave gear segment and the second gear segment is a convex gear segment.

16. An apparatus having an adjustable orientation, the apparatus comprising:
    a bracket to couple to a vertical support structure, the bracket including
        a first gear segment to be parallel with the vertical support structure, and
        a flexible hook having a free end extending up from an attached end, the attached end of the flexible hook coupled to an external surface of the first gear segment;
    an adjustable hanger differing from the bracket, the adjustable hanger to couple to an object and engage the bracket to mount the object to the vertical support structure, the adjustable hanger including a second gear segment to be parallel with the object, the second gear segment to engage the first gear segment of the bracket to hold an orientation of the object;
    a first fastening device to couple the bracket to the vertical support structure; and
    a second fastening device to couple the adjustable hanger to the object;
    wherein the flexible hook to hold the adjustable hanger engaged with the bracket and the object mounted to the vertical support structure.

17. The apparatus of claim 16, wherein
the engagement of the second gear segment of the hanger with the first gear segment of the bracket can be adjusted by one or more teeth to adjust the orientation of the object.

18. The apparatus of claim 16, wherein
the object is an art object.

19. The apparatus of claim 18, wherein
the art object is one of a painting, a photograph, a picture, and a plaque.

20. The apparatus of claim 16, wherein
the first gear segment is a convex gear segment and the second gear segment is a concave gear segment.

21. The apparatus of claim 16, wherein
the first gear segment is a concave gear segment and the second gear segment is a convex gear segment.

22. The adjustable hanging system of claim 11, wherein
the first plurality of fasteners is a plurality of nails; and
the second plurality of fasteners is a plurality of screws.

* * * * *